United States Patent [19]

Bachmann et al.

[11] Patent Number: 5,430,477
[45] Date of Patent: Jul. 4, 1995

[54] DEVICE FOR MOVING AND GUIDING A MOTION-PICTURE FILM IN A TELECINE SCANNER

[75] Inventors: Horst Bachmann, Reinheim; Wolfgang Fell; Werner Maack, both of Seeheim, all of Germany

[73] Assignee: U.S. Philips Corporation, New York, N.Y.

[21] Appl. No.: 207,522

[22] Filed: Mar. 7, 1994

[30] Foreign Application Priority Data

Oct. 30, 1993 [DE] Germany .................... 43 37 156

[51] Int. Cl.⁶ ............................................. H04N 7/01
[52] U.S. Cl. ............................................. 348/97; 348/96
[58] Field of Search ............................. 348/96, 97, 98; 352/188, 190

[56] References Cited

U.S. PATENT DOCUMENTS 3,586,224  6/1971  Adams ..................... 352/188

FOREIGN PATENT DOCUMENTS 9307566  9/1993  Germany ................. H04N 3/38

Primary Examiner—Donald J. Yusko
Assistant Examiner—Michael Day
Attorney, Agent, or Firm—Brian J. Wieghaus

[57] ABSTRACT

A device for moving and guiding a motion-picture film through the film gate of a telecine scanner is proposed, which serves for exactly positioning a film frame. It comprises a carriage which is rectilinearly reciprocated in a guide perpendicular to the optical path of the film gate, on which carriage each film frame is immobilised during the uniform forward movement. The drive means for the carriage comprises a motor-driven cam having a sawtooth-shape with sinusoidal transitions and two latching positions.

17 Claims, 4 Drawing Sheets

DEVICE FOR MOVING AND GUIDING A MOTION-PICTURE FILM IN A TELECINE SCANNER

BACKGROUND OF THE INVENTION

The invention relates to a device for moving and guiding a motion-picture film with sprocket holes through the film gate of a telecine scanner.

When motion-picture films are scanned synchronisation errors arise, for example, as a result of transport fluctuations, dynamic variations in film traction owing to the elasticity of the film stock and, in particular, frame misalignment on the film, which errors may lead to visible horizontal and vertical image unsteadiness. Whereas image unsteadiness may not be annoying in the case of projection in darkened movie theatres for lack of suitable reference points, the annoying effect may increase considerably during television reproduction owing to the illuminated environment and the rapid alternation of electronic recorded images and film shots. Very stringent requirements are imposed on the image steadiness in the case of processes in which computer graphics are combined with film shots by means of chroma-key techniques because the relative movement of the inserted film scenes in the stationary part of the image is particularly annoying.

To mitigate these drawbacks German Utility Model G 93 07 566 proposes a device for the transport of a film through the scanning gate of a film scanner. The '566 device includes a carriage which is rectilinearly reciprocated in a guide perpendicular to the optical path of the film gate and which causes two transport pins which are engageable in reference sprocket holes of the film and define the position of each film frame. The pins immobilize the film frame on the carriage during movement of the carriage. This construction provides a stable positioning of the film frame to be scanned on the reciprocating slide. However, this known device has the drawback that the simple eccentric drive used for the slide movement only allows a sinusoidal movement without any real rest positions during slide reversal, so that owing to the continuous movement of the film the transport cycle may be disturbed again both when the registration pin engages and disengages the sprocket holes. Moreover, this is liable to give rise to damage to the sprocket holes.

Therefore, it is an object of the present invention to provide a device of the type defined in the opening paragraph, which mitigates the above-mentioned drawbacks of the known device and which gives an optimum image steadiness during scanning of the film frame with the normal film speed.

This object is achieved in that drive means for the carriage comprises a rotatable cam having a sawtooth-shape with sinusoidal transitions and two latching positions, the sawtooth-shape having a linearly rising portion (a) of the sawtooth to generate a constant driving speed corresponding to the real film speed, the sinusoidal transitions serve to generate an approach phase and a running-out phase, and one of the two latching positions, which serve to interrupt the carriage movement, precedes and the other follows the linearly rising portion (a).

The device in accordance with the invention having the characteristic has the advantage that owing to the specially shaped cam the carriage performs a so-called pilgrim-step movement, which results in a drive speed corresponding to the actual film speed.

Moreover, it is advantageous that a uniform driving torque is obtained because no springs have to be tensioned and relaxed over a stroke. In addition, higher driving speeds can be handled without any undesired oscillations of springs and masses.

Advantageous modifications and improvements of the device defined in the main claim can be obtained by means of the steps defined in the subsidiary claims.

A special advantage is that a tension-free film loop is situated before and after the carriage, as a result of which the film frame being scanned is free from its environment—with respect to tension, guidance—and is positioned only by the transport pins of the carriage. This enables the film frame to be moved freely by a few tenths of a millimetre in the x direction and the y direction and, in addition, to be rotated in the X/Y plane. The film loops should be dimensioned in such a manner that the reciprocating movement of the carriage is not obstructed.

BRIEF DESCRIPTION OF THE DRAWINGS

An exemplary embodiment of the invention is shown in the drawings and will be described in more detail hereinafter. In the drawings.

DETAILED DESCRIPTION OF THE PREFERRED EMBODIMENTS

Figure 1:
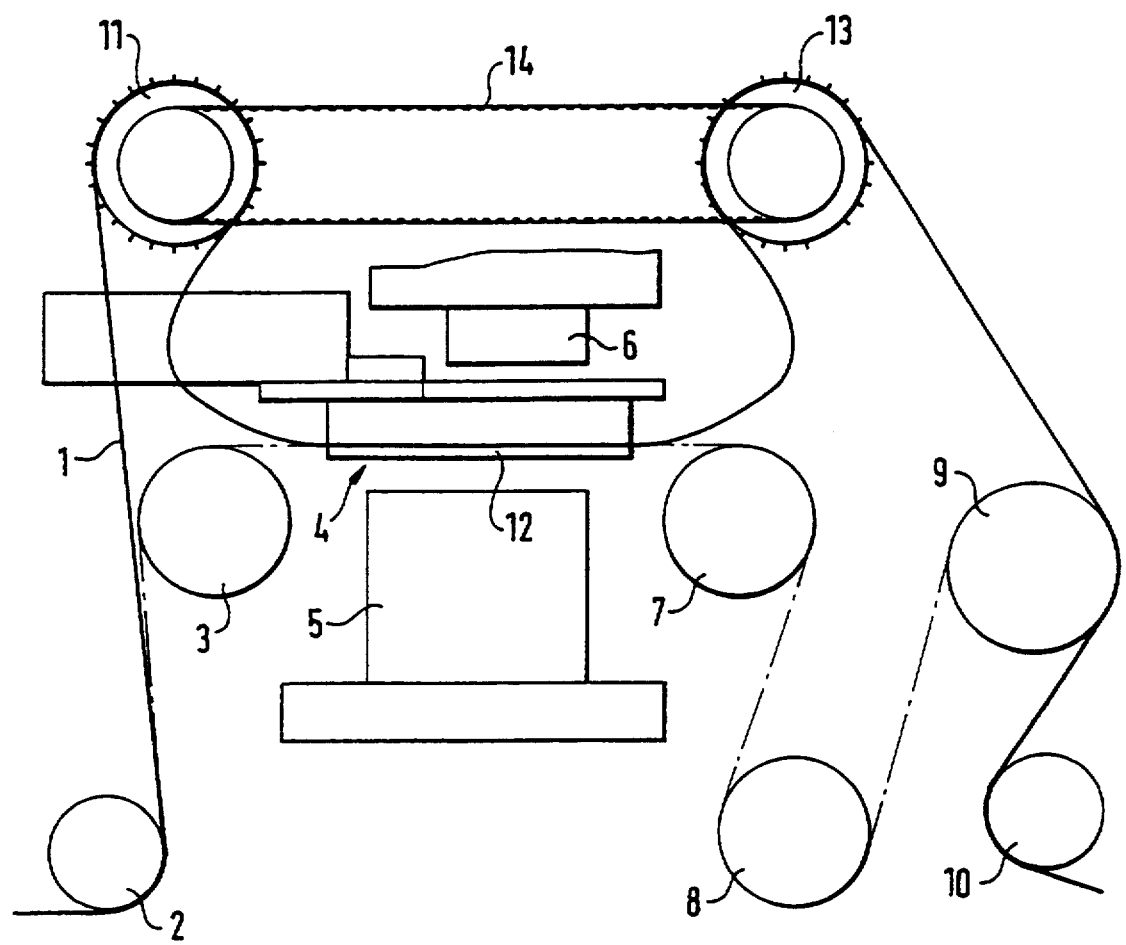
FIG. 1 is a basic diagram of the film transport path in a telecine scanner.

In the prior art film transport path shown in FIG. 1 a motion-picture film 1 is led from a feed spool 2 to a sprocket roller 3 via a deflection roller 2, subsequently to a film-drive capstan 9 via a scanning station 4 comprising an illumination device 5 and a pick-up device 6, in which the film is scanned, via further deflection rollers 7 and 8, and finally to a take-up spool, not shown, via a further deflection roller 10.

When the transport device in accordance with the invention is used the film is no longer fed through the scanning station 4 via the rollers 3 and 7 but runs to the transport carriage 12, by means of which the film is fed through the scanning station, via an additional sprocket roller 11, by means of which a film loop is formed, and to a second additional sprocket roller 13, by means of which another film loop is formed.

During the scanning process a film frame immobilised on the carriage 12 is moved from the left to the right by this carriage, after which the carriage 12 returns to its initial position upon disengagement of the film, immobilises the next film frame, and is again moved to the right for scanning. The carriage thus produces a pilgrim-step film transport movement to the right. The sprocket rollers 11 and 13, which are coupled to one another without slippage by means of a toothed belt 14, are moved with such a constant average speed that the length of the film loop formed when the film is threaded remains constant.

Figure 2:
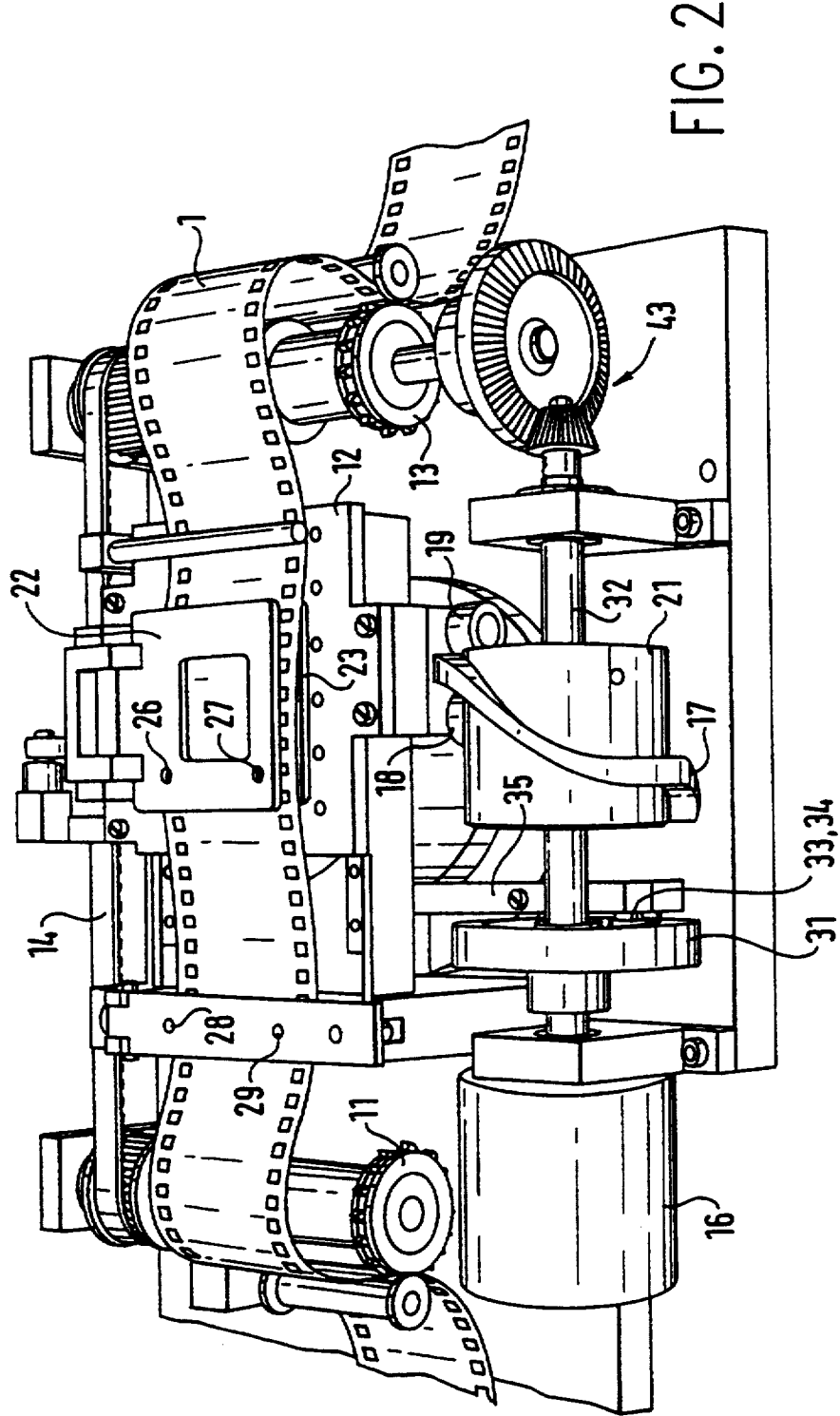
FIG. 2 shows the device in accordance with the invention viewed from the front.

In normal operation the film 1 is passed through the scanning station, not shown in the Figure, from left to right viewed in FIG. 2, the sprocket rollers 11 and 13, which are driven with the average film speed, each maintaining a film loop before and after the scanning station in the film transport direction. In this way the reciprocation of the carriage 12 and the corresponding discontinuous movement of the film 1 are isolated from the continuous movement of the film 1 provided by the capstan.

The carriage is driven by means of a carriage drive motor 16 via a cam 17 which cooperates positively with bearings 18, 19 mounted on the carriage 12. The cam 17 is formed as a curved endless ridge on a drum 21. In the diagram shown in FIG. 4 the curve of the cam 17 has a sawtooth shape with sinusoidal transitions and two latching positions.

On its upper side the carriage 12 carries two frame-shaped flaps 22, 23 between which the film 1 extends. Two holes 24, 25 have been provided in one of the limbs of each of the flaps 22, 23 so as to coincide and are engageable by two transport pins 26, 27 secured to the carriage 12.

When the forward movement of the carriage 12 begins, i.e. at the beginning of the scanning interval of the film frame, the flaps 22, 23 are lowered to move the film 1 against the transport pins 26, 27, which then engage so-called reference sprocket holes, for example in accordance with the well-known Mitchell or Bell & Howell standards. The film 1 is thus retained on the carriage 12 during the forward movement of the carriage. At the end of the scanning interval the flaps 22, 23 are lifted, the film 1 being lifted off the transport pins 26, 27 by the lower flap 23.

During the return of the carriage 12 the flaps 22, 23 and the hence the film 1 remain in the lifted position so that the transport pins are disengaged from the film 1. During the return time the film 1 is retained by means of two registration pins 28, 29, which engage in corresponding sprocket holes.

Both the flap and the registration pin movement are controlled by means of a further cam 31 mounted on the same drive shaft 32 as the cam 17. The further cam 31 takes the form of a radial curve having two different radii and two latching positions. This cam also cooperates positively with two bearings 33, 34 whose movements are transmitted to a linkage 35. The linkage 35 produces a simultaneous lifting movement of the frame-shaped flaps 22, 23 and the registration pins 28, 29, so that the registration pins 28, 29 are lifted and lowered simultaneously with the flaps 22, 23. As a result of this it is possible that in a first rest position of the carriage 12 the transport pins 26, 27 engage the sprocket hole and the registration pins 28, 29 disengage simultaneously in that the flaps 22, 23 are lowered, and in a second rest position of the carriage 12 the transport pins 26, 27 disengage and the registration pins 28, 29 engage simultaneously in that the flaps 22, 23 are lifted.

Figure 3:
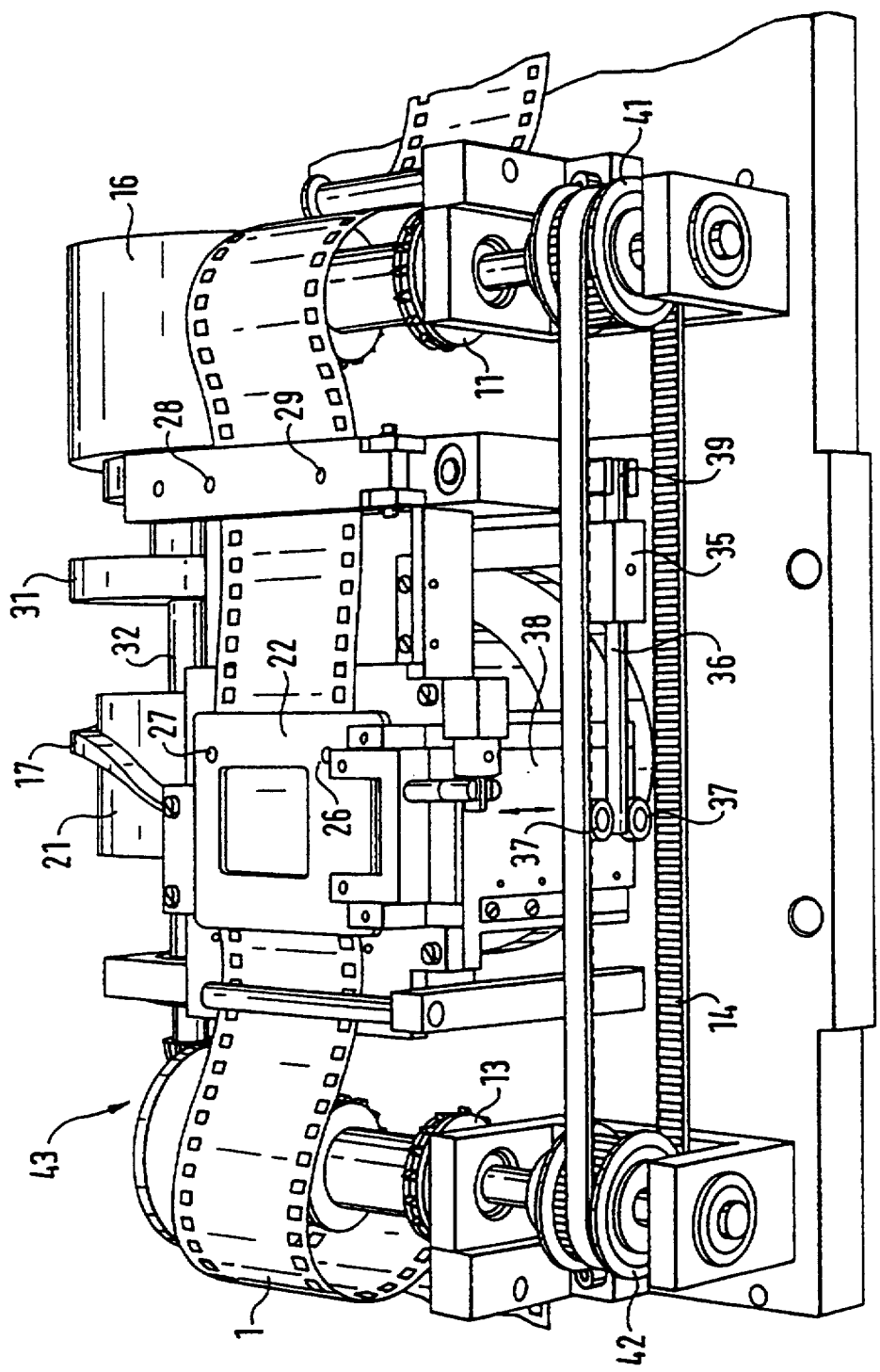
FIG. 3 shows the device in accordance with the invention viewed from the rear.

In the view from the rear in FIG. 3 particularly the guide means of the linkage 35 is clearly visible. By means of two bearings 37 the rod 36 serves primarily for guiding the reciprocating movement of the carriage 12 and for lifting and lowering the flap-actuating mechanism 38 as well as the registration-pin actuating mechanism 39.

The drive rollers 41 and 42 of the sprocket rollers 11 and 13 are coupled to one another without slippage via the toothed belt 14. In the present case driving is not effected via the capstan 9 as shown in FIG. 1 but via the drive shaft 32 and a toothed-wheel drive 43.

Figure 4:
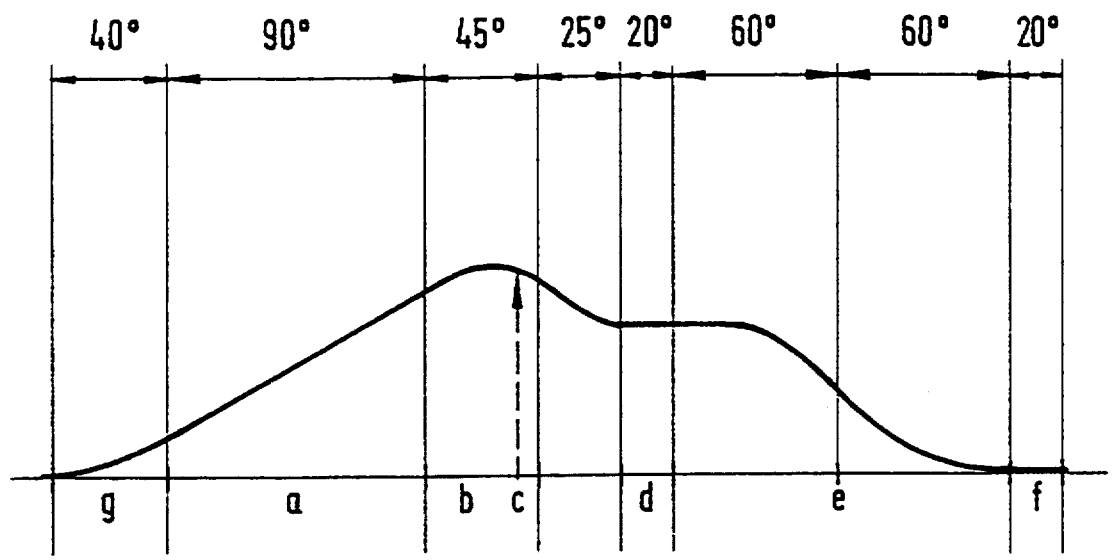
FIG. 4 is a diagram of the carriage transport curve, like parts in the Figures bearing the same reference numerals.

FIG. 4 clearly shows the sawtooth shape and the sinusoidal transitions in the carriage transport curve. The linearly rising portion a of the sawtooth covering 90° of the curve represents the scanning interval in which the carriage 12 with the film 1 is moved forward uniformly. At the end of the scanning interval a the carriage 12 moves on for a short running-out phase b and is subsequently braked until the reversing point c. This is followed by the stationary phase d, in which the carriage stops. At the same time the flaps 22, 23 are lifted, the film 1 is disengaged from the transport pins 26, 27 and is held on the housing by means of the registration pins 28, 29. Subsequently, in the interval e, i.e. over approximately 120° of the curve, the carriage 12 without film moves back to the second stationary phase f. In this phase the flaps 22, 23 are lowered again, i.e. the film 1 is lowered onto the transport pins 26, 27 and the frame is centred and at the same time the registration pins 28, 29 are disengaged from the film 1. After the film 1 has been engaged by the transport pins 26, 27 the carriage 12 with the film 1 is accelerated to the desired film scanning speed in the approach phase g, which speed should then be reached in the scanning interval a. The above cycle can now be repeated.

We claim:

1. A device for moving and guiding a motion-picture film with reference sprocket holes through the film gate of a telecine scanner, said device comprising:

a carriage which is rectilinearly reciprocated in two opposite directions in a guide perpendicular to the optical path of the film gate, said carriage including two transport pins which are engageable in the reference sprocket holes of the film and define the position of each film frame, which pins immobilize each time one film frame on the carriage for the scanning process during the movement of the carriage in one of said two directions; and drive means for the carriage comprising a rotatable carriage transport cam having a sawtooth-shape with sinusoidal transitions and two latching positions, the sawtooth-shape having a linearly rising portion of the sawtooth to generate a constant driving speed in said one direction corresponding to the real film speed, wherein the sinusoidal transitions serve to generate an approach phase and a running-out phase, and wherein the two latching positions serve to interrupt the carriage movement, and one of the two latching positions precedes and the other follows the linearly rising portion.

2. A device as claimed in claim 1, further comprising a housing holding said carriage and drive means, and registration pins which retain the film during the return of the carriage in the other of said two opposite directions.

3. A device as claimed in claim 2, characterised in that during a first interruption of the carriage movement in the one latching position the registration pins are disengaged from the sprocket holes and at the same time the transport pins engage corresponding sprocket holes, and in that during the second interruption in the other latching position the transport pins are disengaged from the sprocket holes and at the same time the registration pins engage the sprocket holes.

4. A device as claimed in claim 1, characterised in that the linearly rising portion covers 90° of the carriage transport cam.

5. A device as claimed in claim 1, characterised in that the carriage transport cam comprises a drum with a protruding ridge.

6. A device as claimed in claim 5, characterised in that the ridge is an endless ridge formed on said drum.

7. A device as claimed in claim 6, characterised in that the ridge cooperates positively with two ball-bearings provided on the carriage.

8. A device as claimed in claim 1, characterised in that the carriage carries a pivotable frame-shaped flap which presses the film frame to be immobilised onto the transport pins during its downward movement, causing said transport pins to engage the reference sprocket holes, and which lift the relevant film frame off the transport pins during its subsequent upward movement.

9. A device as claimed in claim 8, characterised in that the flap movement and the registration pins are controlled by means of a control cam.

10. A device as claimed in claim 9, characterised in that the control cam is a radial cam having two latching positions.

11. A device as claimed in claim 10, characterised in that the control cam cooperates positively with two ball-bearings.

12. A device as claimed in claim 11, characterised in that the bearings are secured to a linkage for moving the registration pins and the flap.

13. A device as claimed in claim 8, characterised in that the pivotable frame-shaped flap comprises upper and lower flap sections between which the film extends and is lowered onto the transport pins by means of the upper flap section before scanning and is lifted off the transport pins by means of the lower flap section after scanning.

14. A device as claimed in claim 9, characterised in that the carriage transport cam and the control cam are disposed on a common shaft.

15. A device as claimed in claim 10, characterised in that the latching positions of the carriage transport cam and the control cam concur.

16. A device as claimed in claim 1, further comprising a pair of sprocket rollers in the film transport path, one roller being disposed before and one roller being disposed after the carriage, for the uniform transport of the film so that the film extends as a loop between the respective sprocket roller and the carriage, means for driving one sprocket roller with the average film speed, and a non-slip toothed belt driven by said one sprocket roller which drives the other sprocket roller.

17. A device as claimed in claim 16, characterised in that the one sprocket roller is driven by the common shaft.

* * * * *